(12) United States Patent
Kobayashi et al.

(10) Patent No.: US 11,820,319 B2
(45) Date of Patent: Nov. 21, 2023

(54) AIRBAG DEVICE

(71) Applicant: Autoliv Development AB, Vargarda (SE)

(72) Inventors: Yuto Kobayashi, Kanagawa (JP); Mitsuo Nogami, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 19 days.

(21) Appl. No.: 17/594,480

(22) PCT Filed: Mar. 27, 2020

(86) PCT No.: PCT/JP2020/014285
§ 371 (c)(1),
(2) Date: Oct. 18, 2021

(87) PCT Pub. No.: WO2020/217859
PCT Pub. Date: Oct. 29, 2020

(65) Prior Publication Data
US 2023/0054543 A1    Feb. 23, 2023

(30) Foreign Application Priority Data

Apr. 24, 2019    (JP) .................................. 2019-083252

(51) Int. Cl.
*B60R 21/239*    (2006.01)
*B60R 21/015*    (2006.01)
(Continued)

(52) U.S. Cl.
CPC ...... *B60R 21/239* (2013.01); *B60R 21/01554* (2014.10); *B60R 21/207* (2013.01);
(Continued)

(58) Field of Classification Search
CPC ............ B60R 21/239; B60R 21/01554; B60R 21/207; B60R 21/23138; B60R 21/2338; B60R 2021/23146; B60R 2021/2395
See application file for complete search history.

(56) References Cited

U.S. PATENT DOCUMENTS 9,650,011 B1 *  5/2017  Belwafa ................ B60R 21/233
2009/0121461 A1 *  5/2009  Abe .................... B60R 21/2338
                                                            280/742
(Continued)

FOREIGN PATENT DOCUMENTS

CN        102822015 B   * 11/2015  ............... B60N 2/42
CN        109334605 A   *  2/2019  ........... B60R 21/207
(Continued)

OTHER PUBLICATIONS

JP H081982 Y2, Energy Absorption structure on the vehicle body side, English Machine translation, ip.com (Year: 1990).*
(Continued)

*Primary Examiner* — Karen Beck
(74) *Attorney, Agent, or Firm* — Harness, Dickey & Pierce, P.L.C.; Stephen T. Olson

(57) ABSTRACT

The airbag device includes a first airbag cushion part and a second airbag cushion part installed on each side of a seat of a vehicle, a first active vent provided in the first airbag cushion part and a second active vent provided in the second airbag cushion part, and a controller that controls the first active vent or the second active vent to open and the other to close when the first airbag cushion part and the second airbag cushion part are expanded and deployed.

15 Claims, 16 Drawing Sheets

(51) Int. Cl.
  *B60R 21/207* (2006.01)
  *B60R 21/231* (2011.01)
  *B60R 21/233* (2006.01)
  *B60R 21/2338* (2011.01)
(52) U.S. Cl.
  CPC ........ *B60R 21/233* (2013.01); *B60R 21/2338* (2013.01); *B60R 21/23138* (2013.01); *B60R 2021/2395* (2013.01); *B60R 2021/23107* (2013.01); *B60R 2021/23146* (2013.01)

(56) References Cited

U.S. PATENT DOCUMENTS

| | | | | |
|---|---|---|---|---|
| 2012/0299277 | A1* | 11/2012 | Fischer | B60R 21/239 280/739 |
| 2017/0267205 | A1* | 9/2017 | Numazawa | B60N 2/143 |
| 2021/0094499 | A1* | 4/2021 | Deng | B60R 21/261 |
| 2021/0221315 | A1* | 7/2021 | Deng | B60N 2/14 |

FOREIGN PATENT DOCUMENTS

| | | | | |
|---|---|---|---|---|
| DE | 10142819 | A1 * | 4/2003 | ....... B60R 21/23138 |
| DE | 202006002605 | U1 * | 6/2006 | ....... B60R 21/01516 |
| DE | 102017102757 | A1 * | 9/2017 | ............. B60N 2/143 |
| DE | 102019127475 | A1 * | 4/2020 | ........... B60R 21/203 |
| EP | 1452406 | A1 * | 9/2004 | ........... B60N 2/2806 |
| JP | 09136598 | A * | 5/1997 | |
| JP | 2009-40206 | A | 2/2009 | |
| JP | 2010-6237 | A | 1/2010 | |
| JP | 2019-6153 | A | 1/2019 | |
| KR | 20180057462 | A * | 5/2018 | ......... B60R 21/2338 |
| KR | 20190046514 | A * | 5/2019 | |
| WO | 2013-099888 | A1 | 7/2013 | |
| WO | 2018/167911 | A1 | 9/2018 | |
| WO | WO-2020130427 | A1 * | 6/2020 | ........... B60R 21/207 |
| WO | WO-2020217859 | A1 * | 10/2020 | |

OTHER PUBLICATIONS

Takata-Petri, DE 20 2006 002605 U1, Machine English Translation, ip.com (Year: 2006).*
Lee, KR 10 2019 0046514, Machine English Translation, ip.com (Year: 2019).*
Yamada, S. JP 09-136598A, Machine English Translation, ip.com (Year: 1997).*
Microfilm of the specification and drawings annexed to the request of Japanese Utility Model Application No. 17673/1990 (Laid-open No. 108564/1991) (Mazda Motor Corp.) Nov. 7, 1991, p. 5, lines 13-16, p. 7, lines 3-10, fig. 1-6, 13.

* cited by examiner

[FIG. 1]
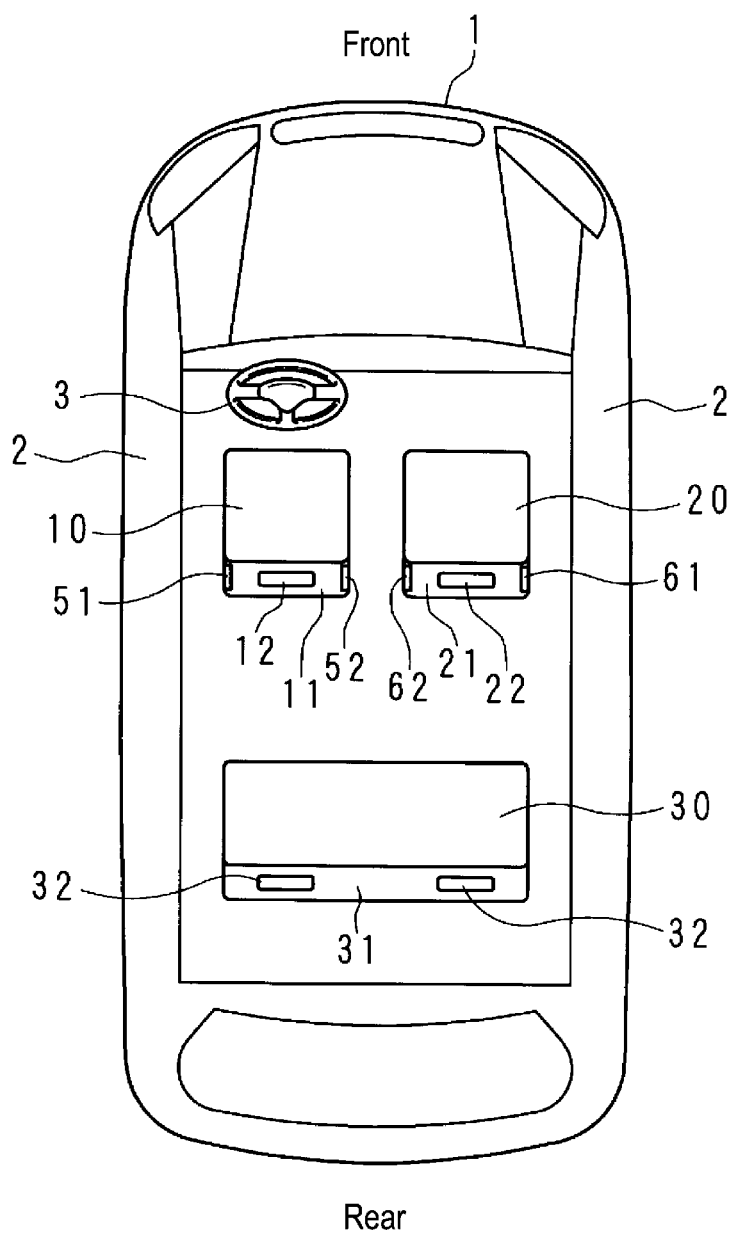

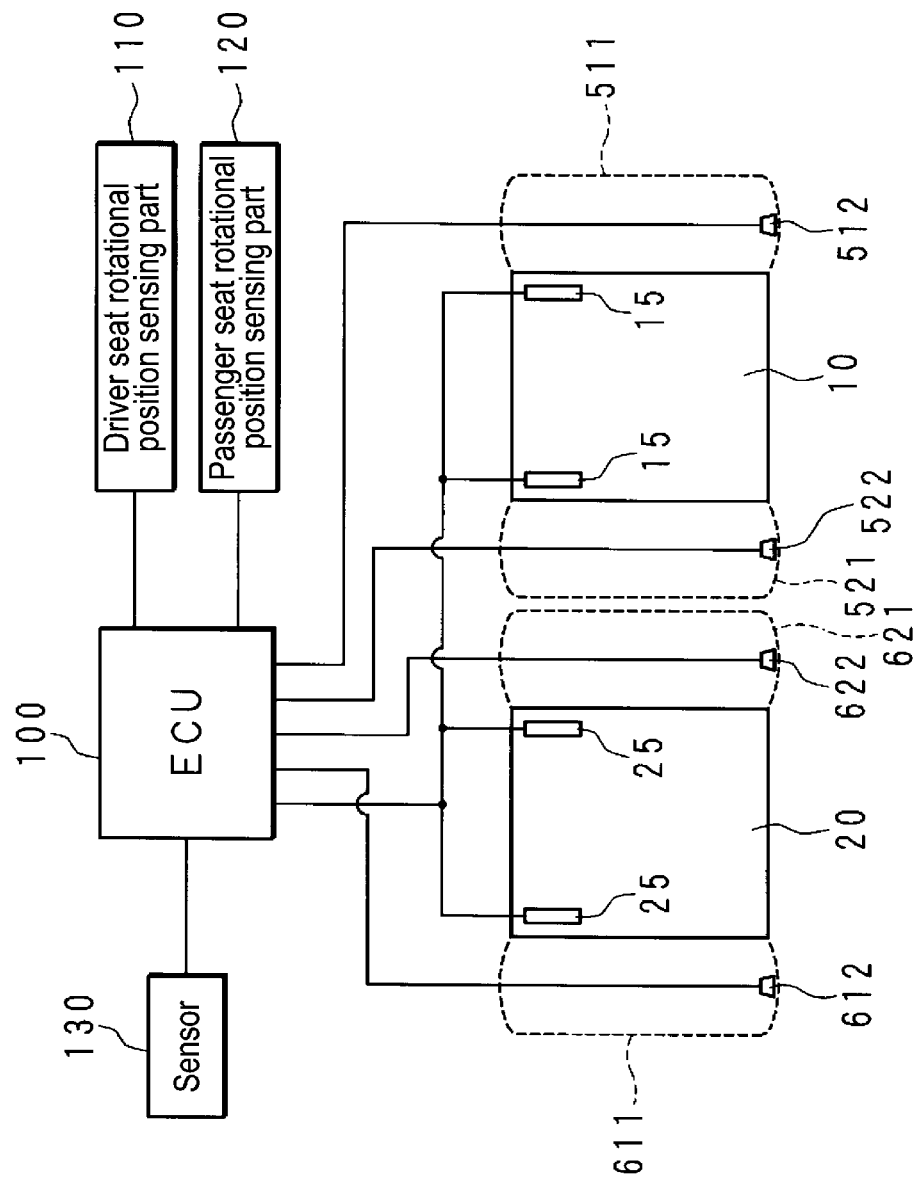
[FIG. 2]

[FIG. 3]
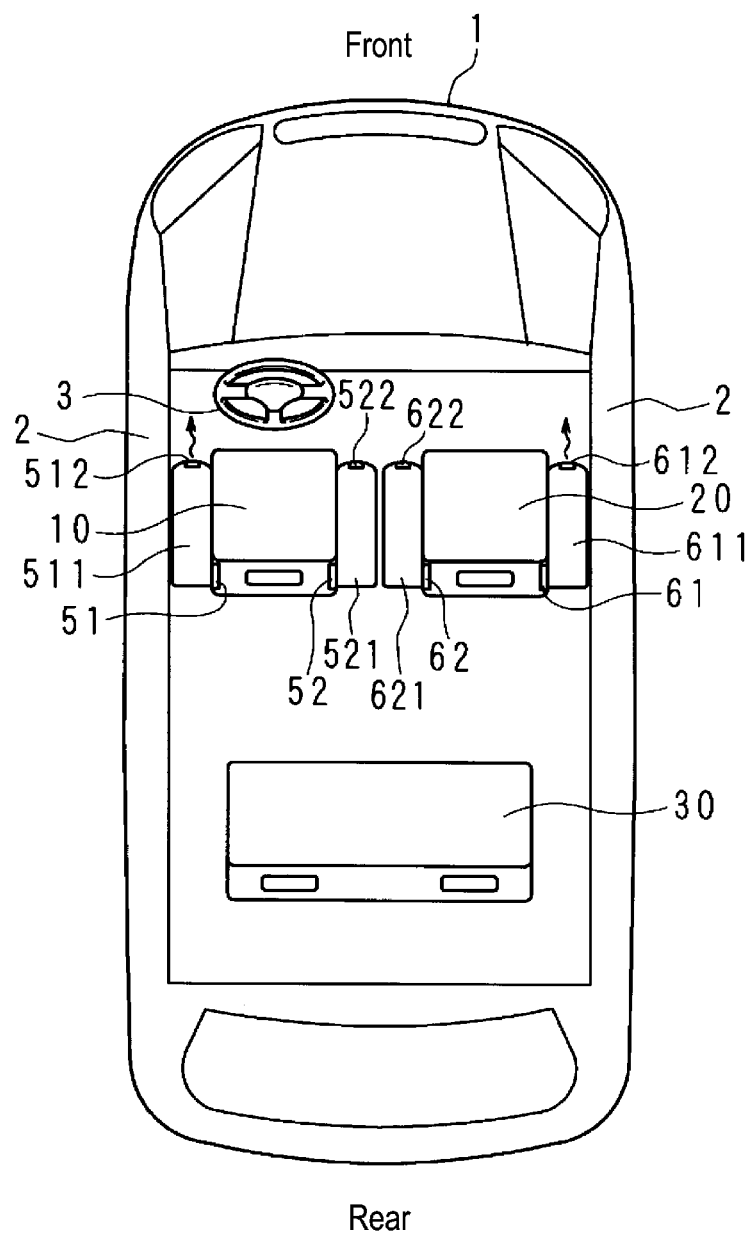

[FIG. 4]
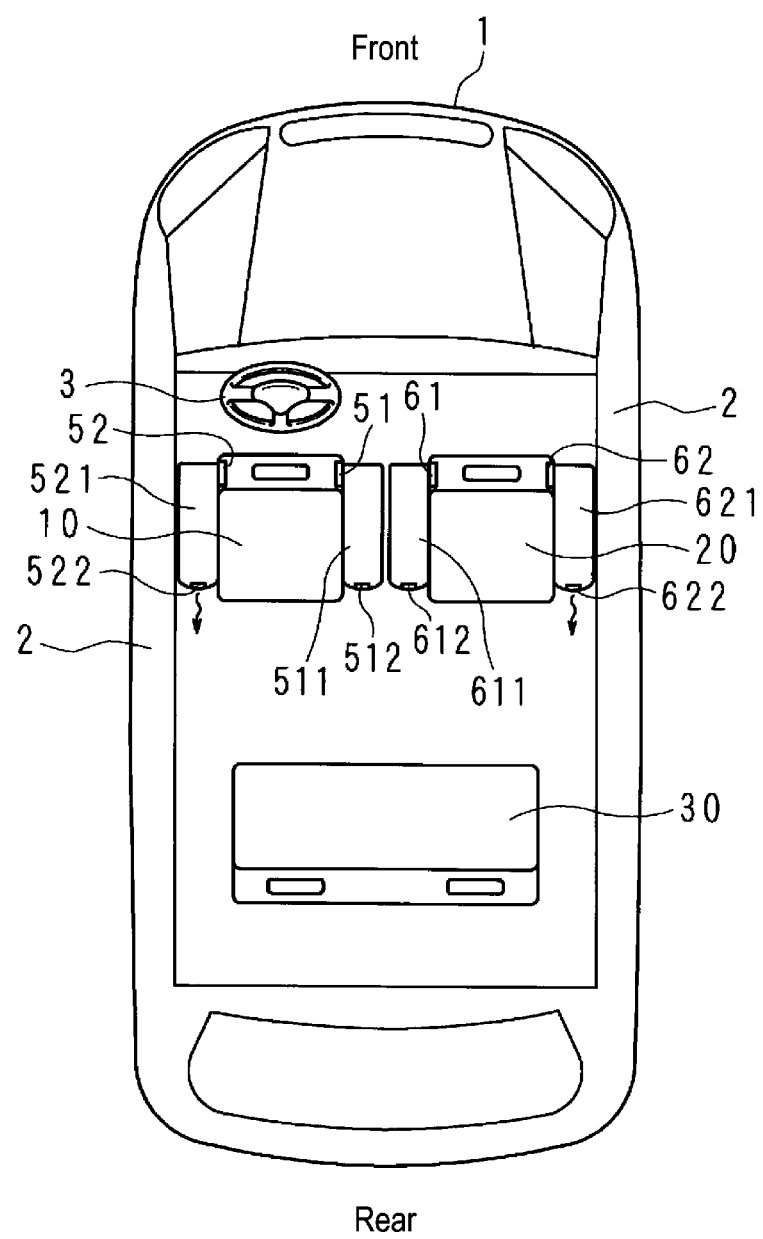

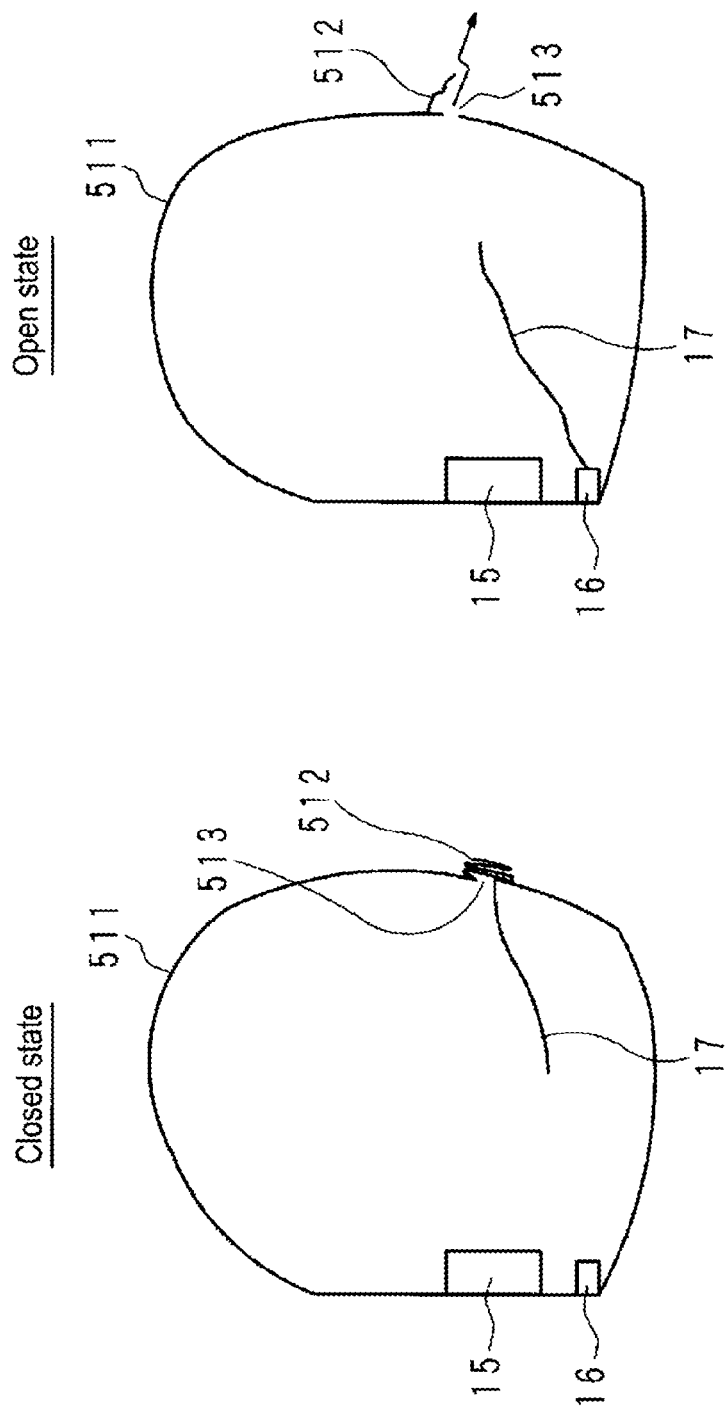
[FIG. 5]

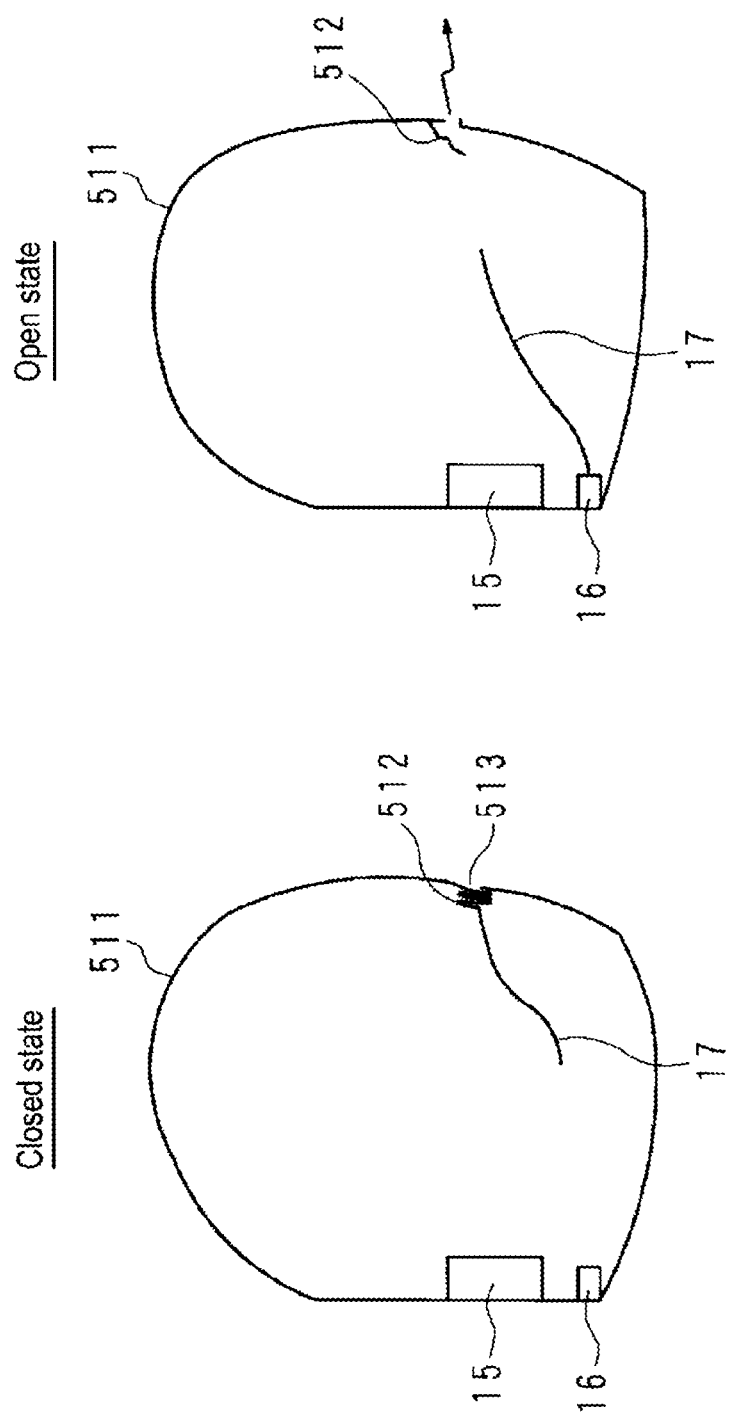

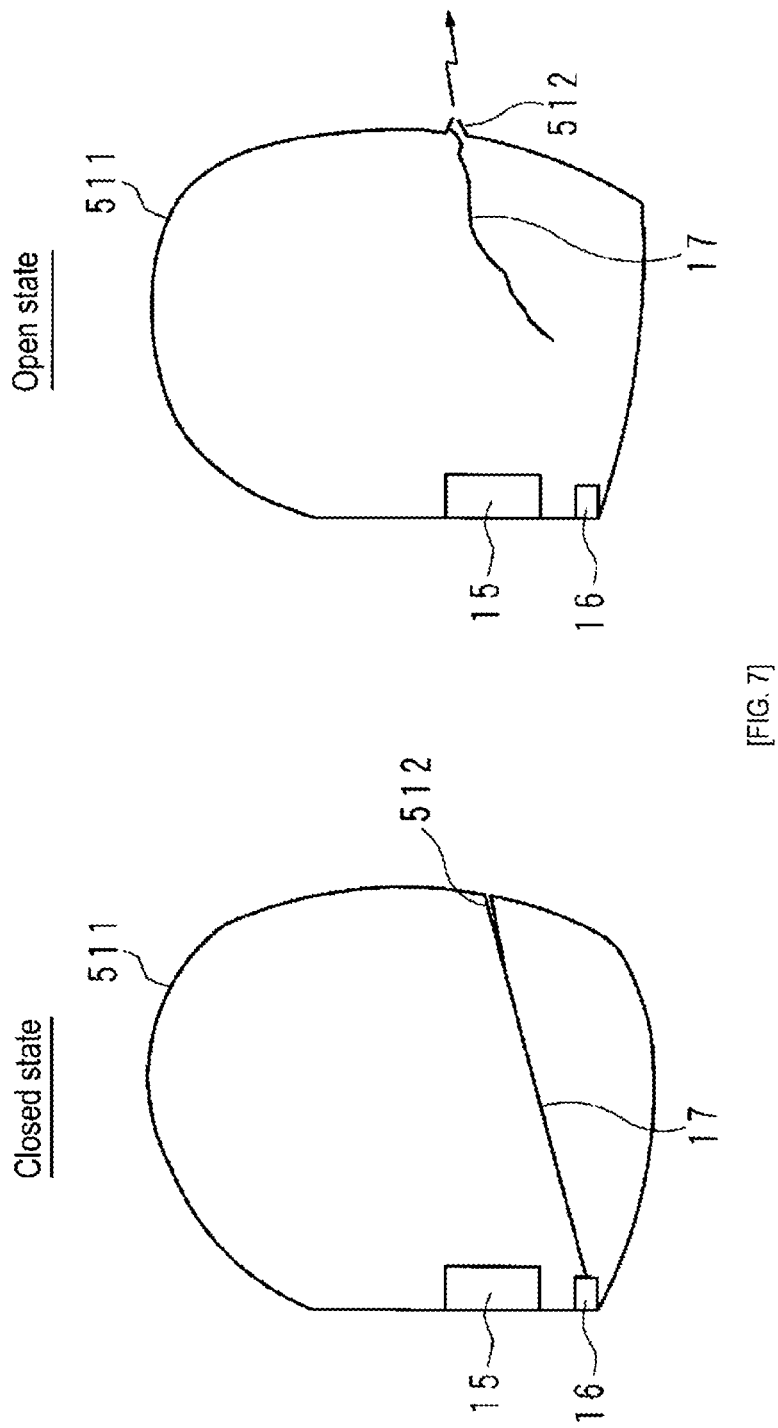
[FIG. 7]

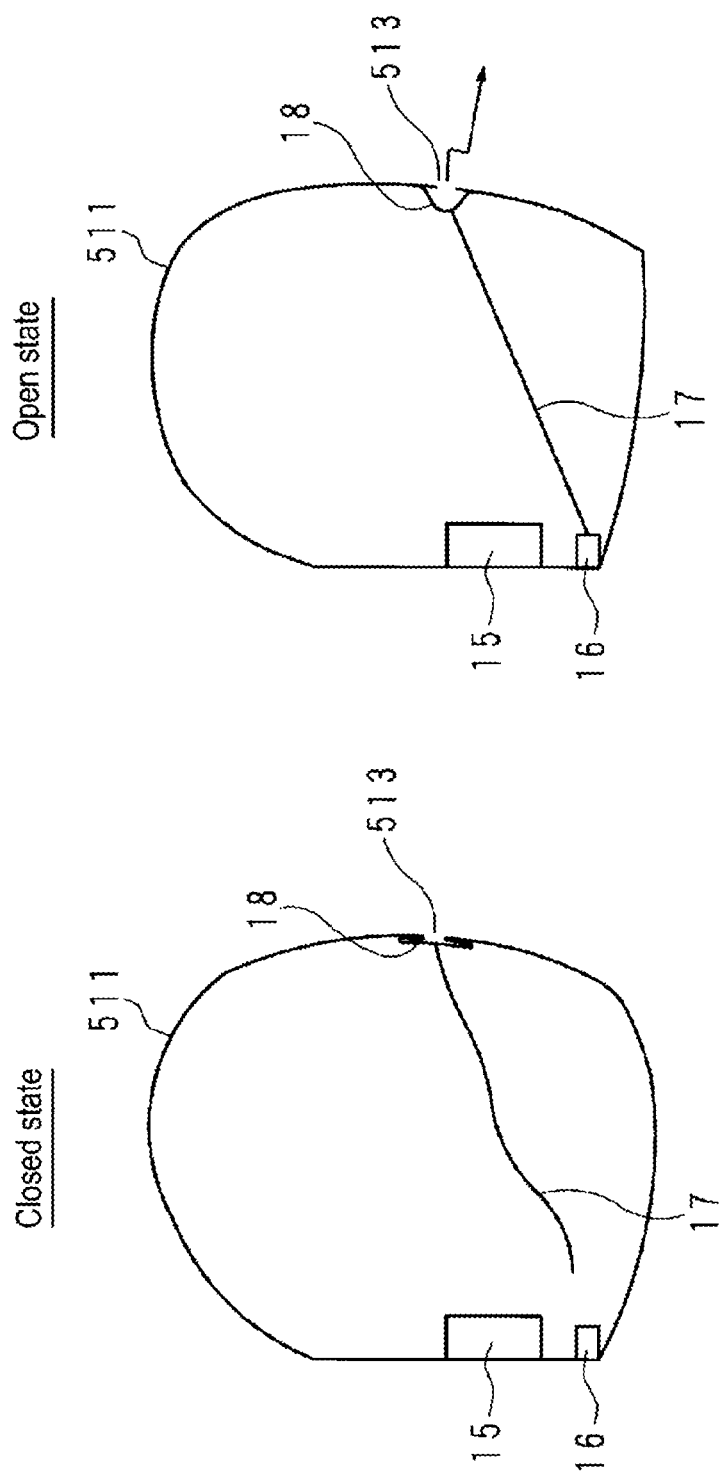
[FIG. 8]

[FIG. 9A]
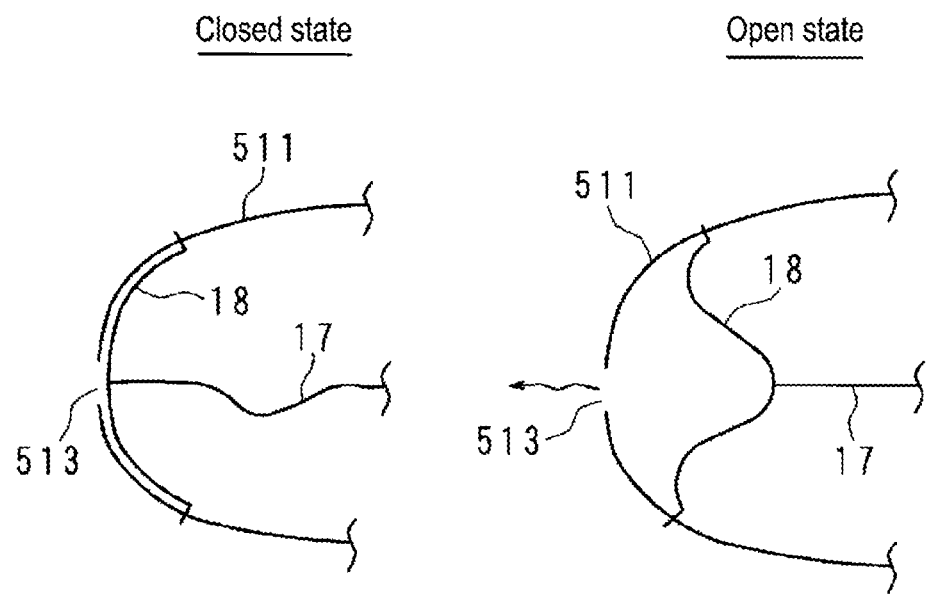
[FIG. 9B]
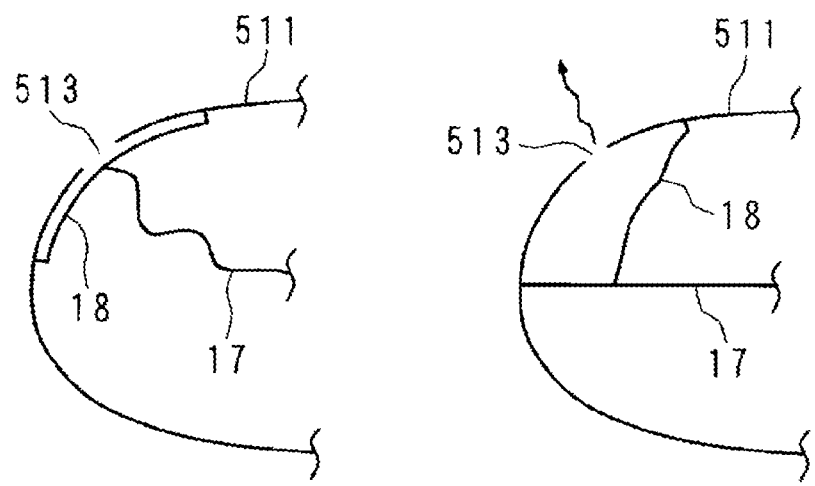

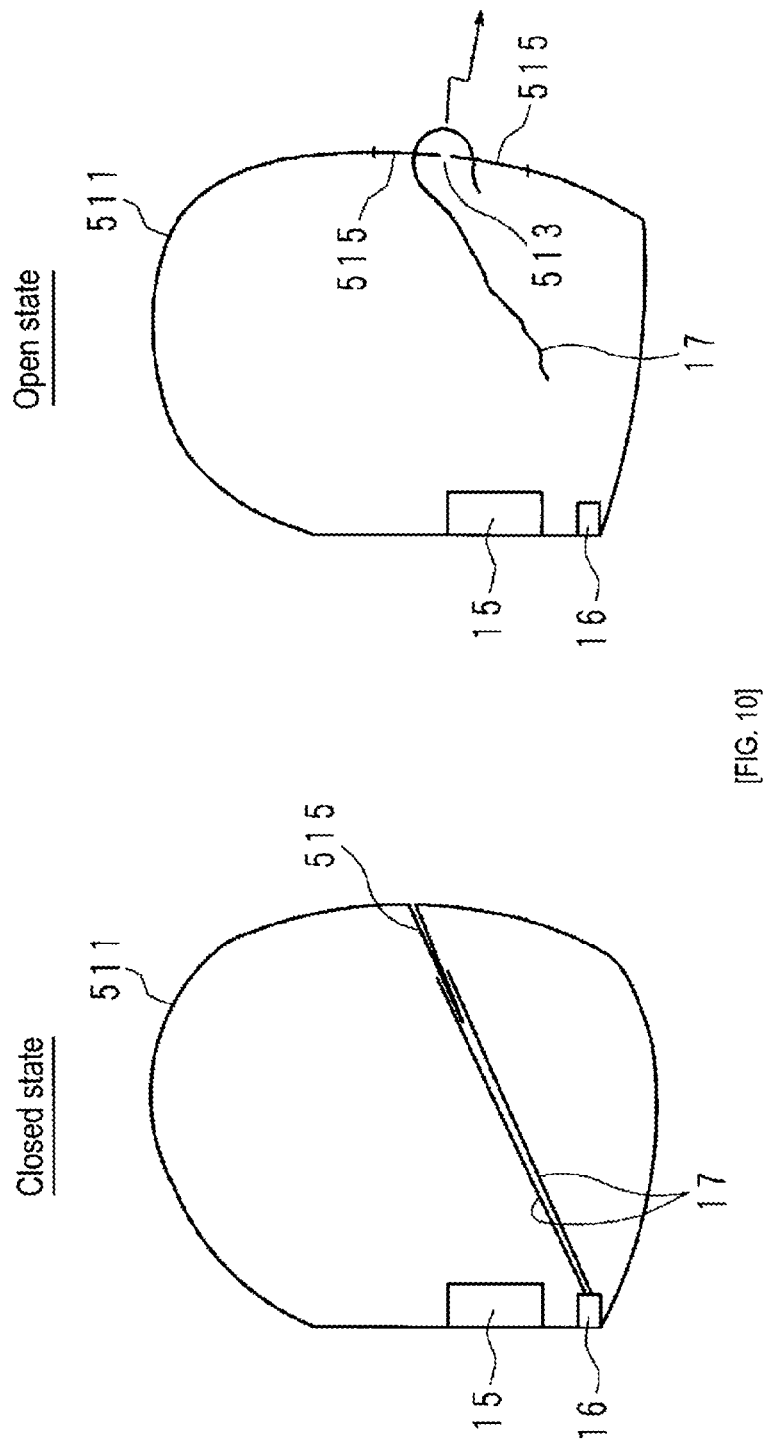
[FIG. 10]

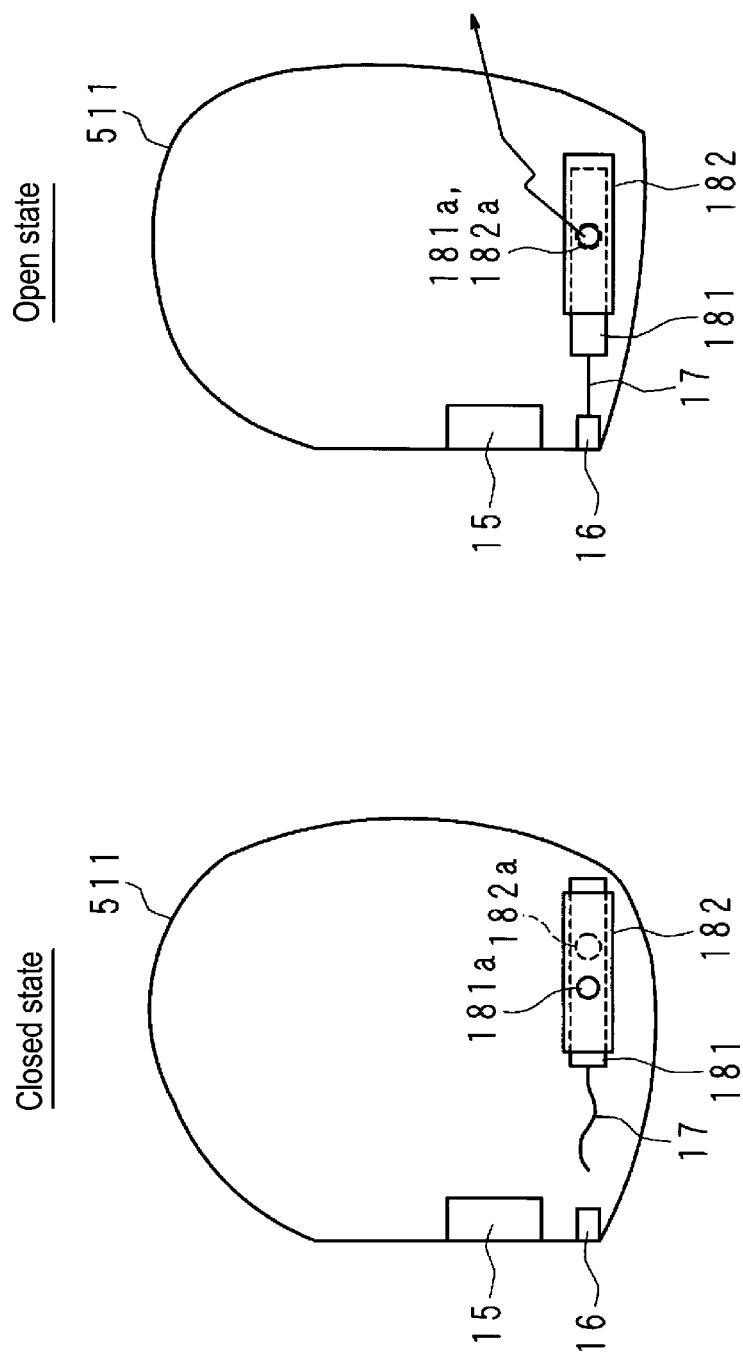

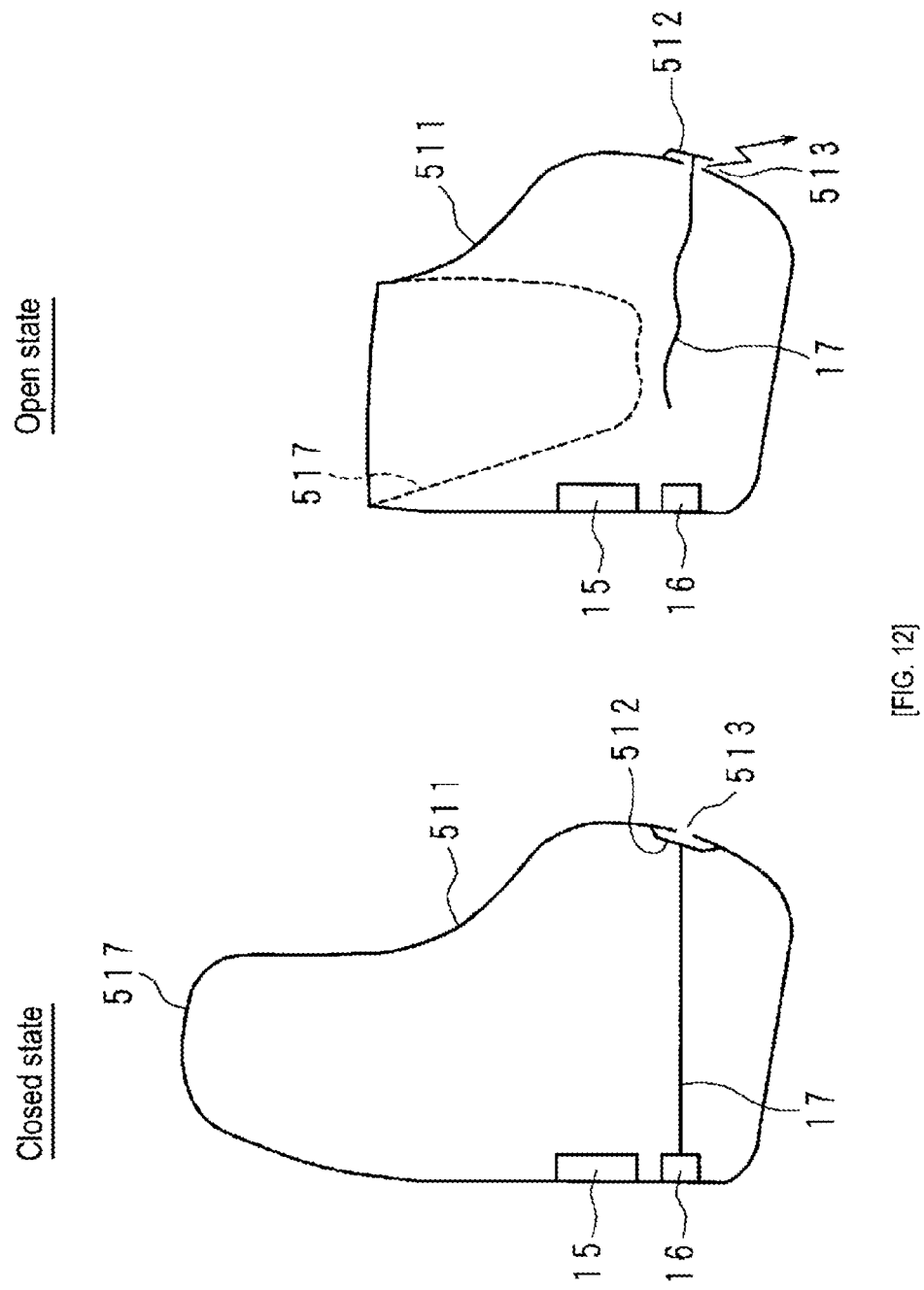

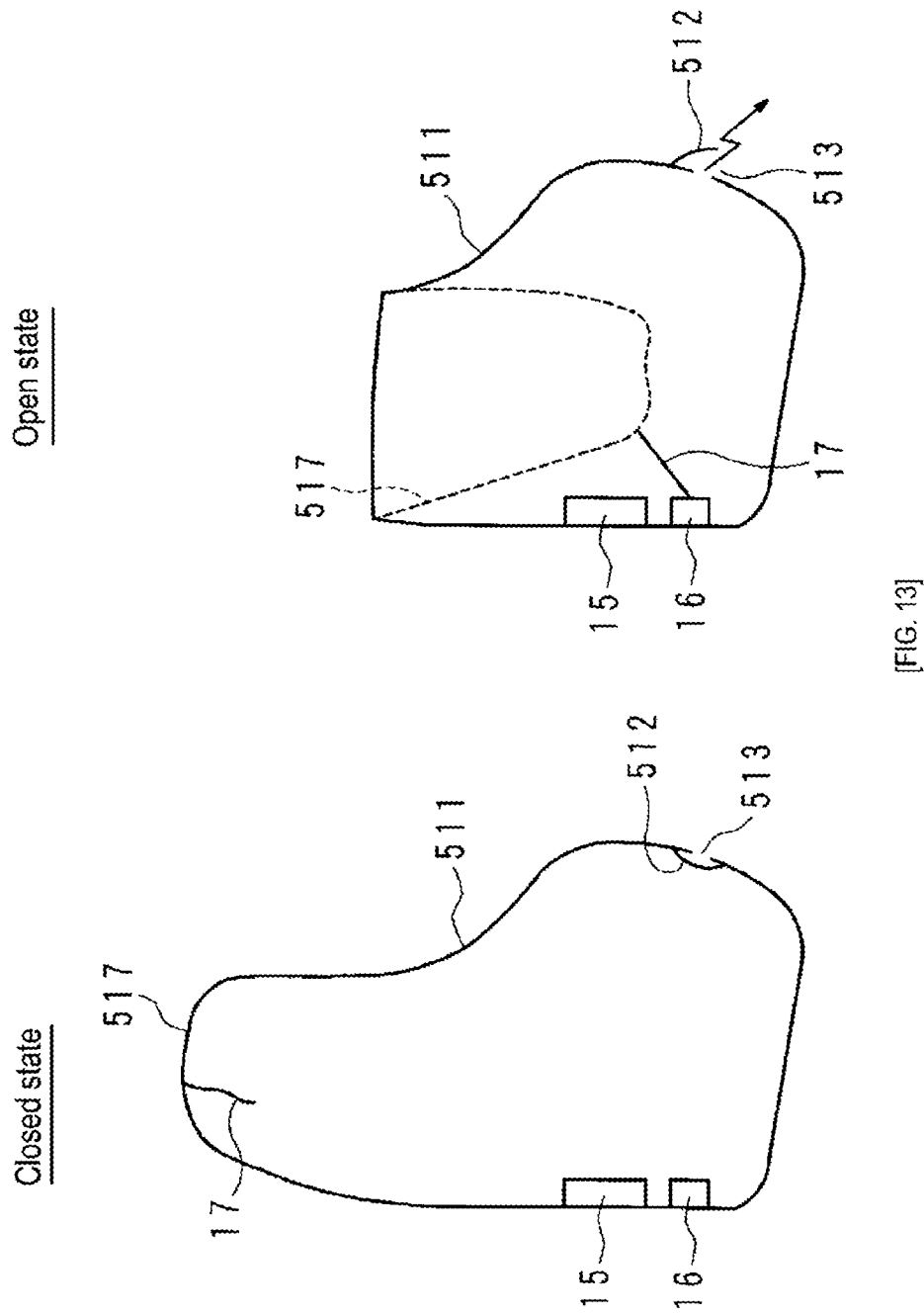

[FIG. 14]
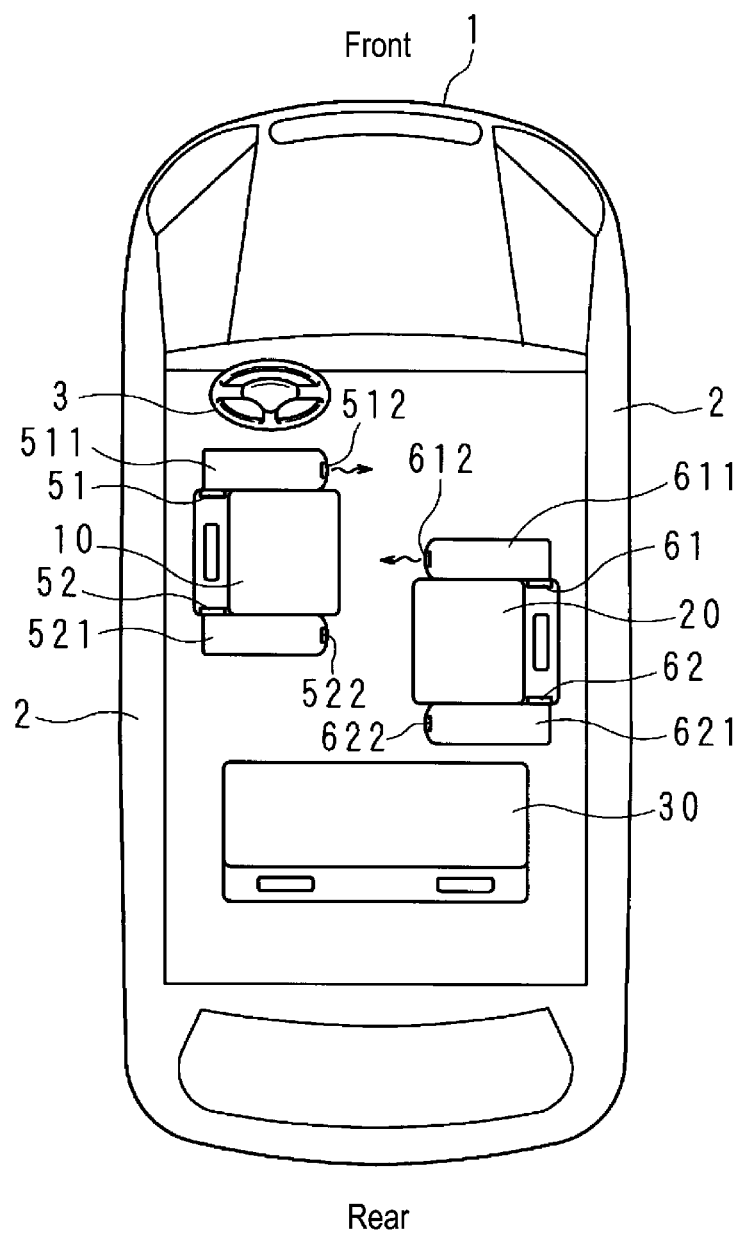

[FIG. 15]
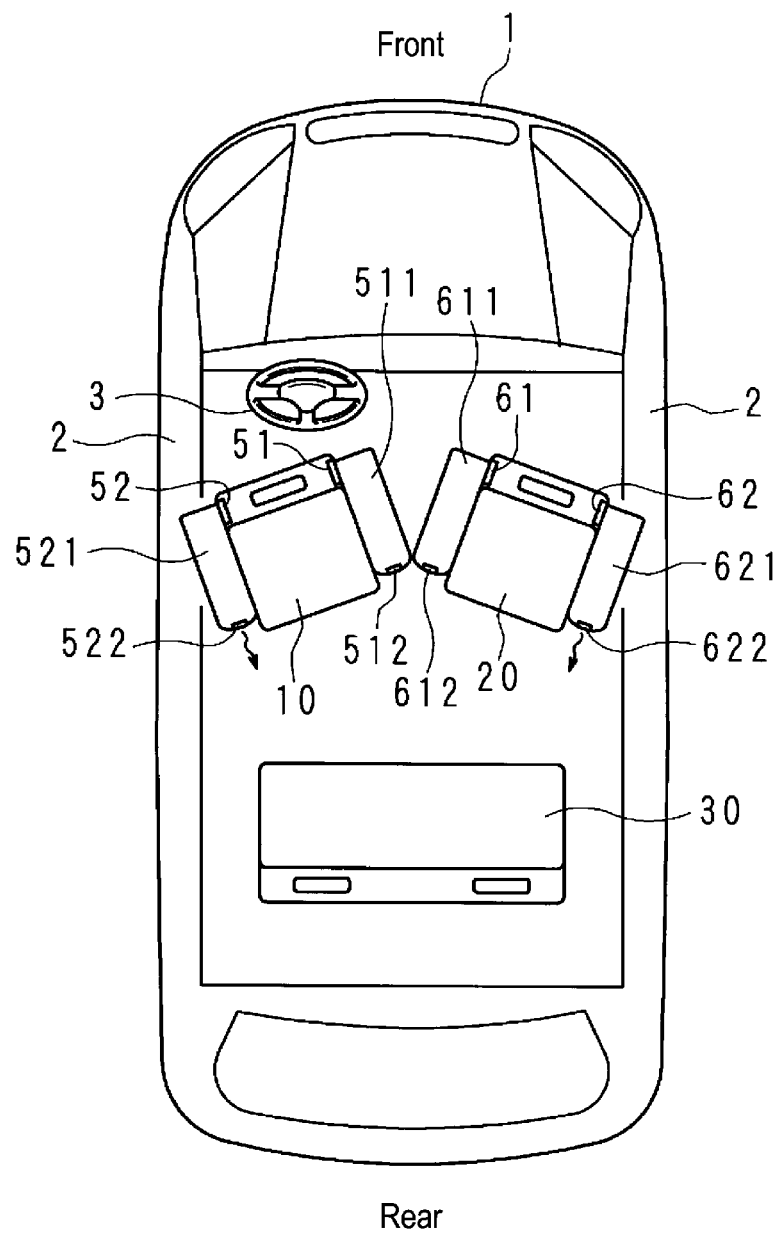

[FIG. 16]
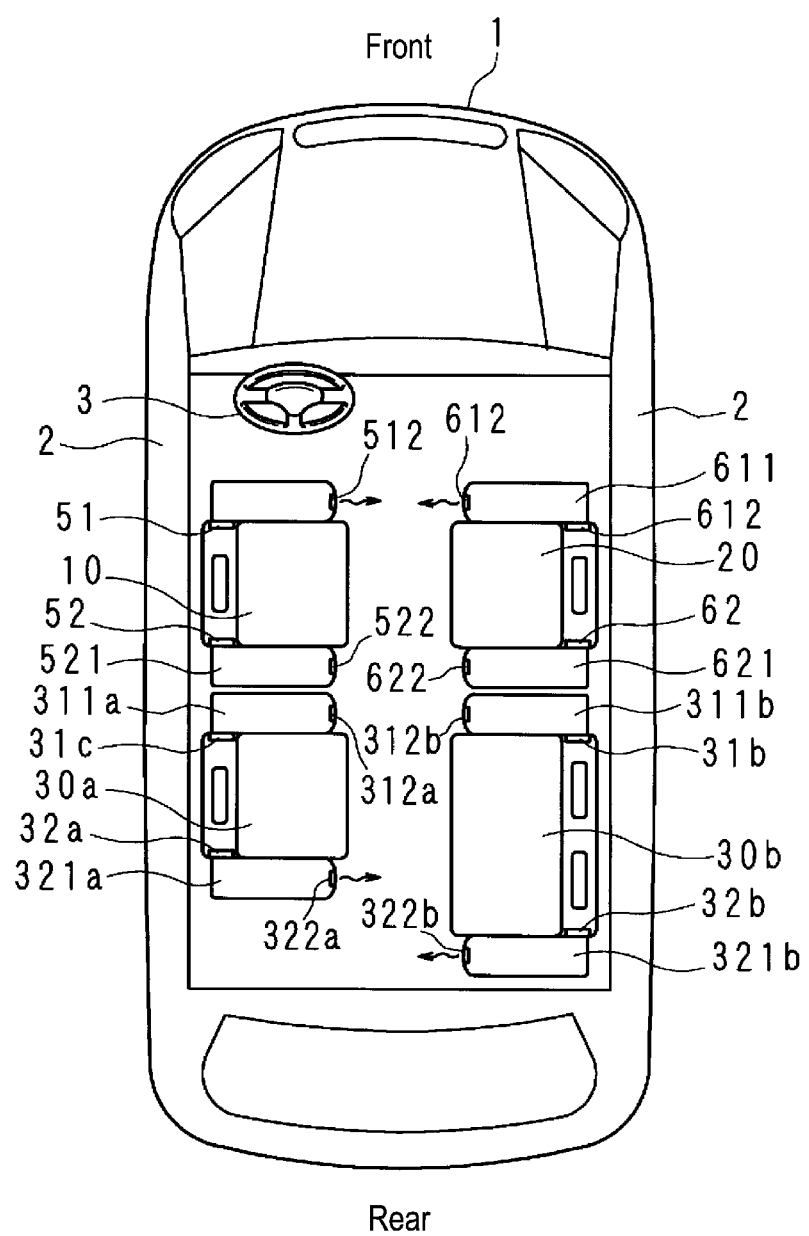

AIRBAG DEVICE

TECHNICAL FIELD

The present invention relates to an airbag device.

BACKGROUND ART

Vehicles are equipped with airbags as safety devices that are activated in the event of a collision or other emergency. For example, the driver seat airbag is installed in the center of the steering wheel, and the passenger seat airbag is installed in the instrument panel in the vehicle.

Patent Document 1 discloses a vehicle seat that can suppress the movement of an occupant in the vehicle width direction by deploying a tension cloth provided in the vehicle width direction of the vehicle seat in the event of a collision.

RELATED ART DOCUMENTS

Patent Documents

[Patent Document 1]: WO 2013-099888

SUMMARY OF THE INVENTION

Problem to be Solved by the Invention

In recent years, the development of autonomous driving technologies have been progressing, and it is conceivable that the seats in the vehicle can be moved or rotated during autonomous driving according to the passenger's preference. However, when the position of the seat is changed, the direction of the seated occupant changes, which may result in insufficient restraint of the occupant by the airbag during a collision.

In light of such circumstances, an object of the present invention is to provide an airbag device capable of improving the restraining performance of an occupant by an airbag during a collision.

Means for Solving the Problem

The airbag device of the present invention includes a first airbag cushion part and a second airbag cushion part installed on each side of a seat of a vehicle, a first active vent provided in the first airbag cushion part and a second active vent provided in the second airbag cushion part, and a controller that controls the first active vent or the second active vent to open and the other to close when the first airbag cushion part and the second airbag cushion part are expanded and deployed.

Effects of the Invention

According to the present invention, the restraining performance of the occupant can be improved.

BRIEF DESCRIPTION OF THE DRAWINGS

FIG. 1 is a schematic diagram illustrating an example of a seating arrangement of a vehicle.

FIG. 2 is a schematic diagram illustrating an example of the configuration of the airbag device of the present embodiment.

FIG. 3 is a schematic diagram illustrating an example of the state of the airbag cushion part in the event of a collision in the case of the first arrangement example of the driver seat and passenger seat.

FIG. 4 is a schematic diagram illustrating an example of the state of the airbag cushion part in the event of a collision in the case of the second arrangement example of the driver seat and passenger seat.

FIG. 5 is a schematic diagram illustrating the first example of an active vent configuration.

FIG. 6 is a schematic diagram illustrating the second example of an active vent configuration.

FIG. 7 is a schematic diagram illustrating the third example of an active vent configuration.

FIG. 8 is a schematic diagram illustrating the fourth example of an active vent configuration.

FIG. 9A is a schematic diagram illustrating the fifth example of an active vent configuration.

FIG. 9B is a schematic diagram illustrating the fifth example of an active vent configuration.

FIG. 10 is a schematic diagram illustrating the sixth example of an active vent configuration.

FIG. 11 is a schematic diagram illustrating the seventh example of an active vent configuration.

FIG. 12 is a schematic diagram illustrating the first example of the state of the head cushion part in the event of a collision.

FIG. 13 is a schematic diagram illustrating the second example of the state of the head cushion part in the event of a collision.

FIG. 14 is a schematic diagram illustrating an example of the state of the airbag cushion part in the event of a collision in the case of the third arrangement example of the driver seat and passenger seat.

FIG. 15 is a schematic diagram illustrating an example of the state of the airbag cushion part in the event of a collision in the case of the fourth arrangement example of the driver seat and passenger seat.

FIG. 16 is a schematic diagram illustrating an example of the state of the airbag cushion part in the event of a collision in the case of the fifth arrangement example of the driver seat and passenger seat.

DESCRIPTION OF THE PREFERRED EMBODIMENT

An embodiment of the present invention is described below based on the drawings. FIG. 1 is a schematic diagram illustrating an example of a seating arrangement of a vehicle. A driver seat 10, a passenger seat 20, and rear seats 30 are arranged as seats in a vehicle 1, and a steering wheel 3 is arranged in front of the driver seat 10. While the so-called left-hand drive is illustrated in FIG. 1, right-hand drive may also be used. The driver seat 10 is provided with a seatback 11, a headrest 12, a storing part 51 for storing an airbag cushion part on one side of the driver seat 10, and a storing part 52 for storing an airbag cushion part on the other side of the driver seat 10. The passenger seat 20 is provided with a seatback 21, a headrest 22, a storing part 61 for storing an airbag cushion part on one of the right or left sides of the passenger seat 20, and a storing part 62 for storing an airbag cushion part on the other of the right or left sides of the passenger seat 20. The rear seats 30 are provided with seatbacks 31 and headrests 32. The driver seat 10, the passenger seat 20, and the rear seats 30 are also referred to herein collectively as seats.

The positions of the driver seat 10 and the passenger seat 20 (orientation of the seated occupant) in FIG. 1 indicate their normal positions. In other words, the airbag cushion part on one side of the driver seat 10 (in the diagram, the airbag cushion part stored in the storing part 51) is located closer to a body 2 of the vehicle 1, and the airbag cushion part on the other side of the driver seat 10 in the lateral direction (in the diagram, the airbag cushion part stored in the storing part 52) is located far from the body 2 of the vehicle 1. The same applies to the left and right airbag cushion parts of the passenger seat 20. The vehicle 1 is capable of driving under autonomous driving control (for example, at a level that does not require operation by the driver), and the driver seat 10 and the passenger seat 20 are installed so that they can rotate 360 degrees.

FIG. 2 is a schematic diagram illustrating an example of the configuration of the airbag device of the present embodiment. The airbag device is provided with an electronic control unit (ECU) 100 as a controller, a first airbag cushion part 511 and a second airbag cushion part 521 installed in the driver seat 10, a first active vent 512 provided in the first airbag cushion part 511 and a second active vent 522 provided in the second airbag cushion part 521, and an inflator (gas generating device) 15 provided in each of the first airbag cushion part 511 and the second airbag cushion part 521. The airbag device also includes a first airbag cushion part 611 and a second airbag cushion part 621 installed in the passenger seat 20, a first active vent 612 provided in the first airbag cushion part 611, a second active vent 622 provided in the second airbag cushion part 621, and an inflator (gas generating device) 25 provided in each of the first airbag cushion part 611 and the second airbag cushion part 621. A sensor 130 for detecting a collision of the vehicle 1, a driver seat rotational position sensing part 110 for detecting the rotation position of the driver seat 10, and a passenger seat rotational position sensing part 120 for detecting the rotation position of the passenger seat 20 are connected to the ECU 100. In FIG. 2, the first airbag cushion part 511, the second airbag cushion part 521, the first airbag cushion part 611, and the second airbag cushion part 621 are illustrated in dashed lines as expanded and deployed for convenience.

In the event of a vehicle collision, the ECU 100 activates the inflators 15 and 25 based on a signal output by the sensor 130. The inflator 15 is, for example, filled with compressed gas and supplies gas into the first airbag cushion part 511 and the second airbag cushion part 521 based on an activation signal output by the ECU 100 to cause the first airbag cushion part 511 and the second airbag cushion part 521 to expand and deploy. Similarly, the inflator 25 is filled with compressed gas, for example, and supplies gas into the first airbag cushion part 611 and the second airbag cushion part 621 based on an activation signal output by the ECU 100 to expand and deploy the first airbag cushion part 611 and the second airbag cushion part 621.

The ECU 100 controls one of the first active vent 512 and the second active vent 522 to open and the other to close based on the signal output by the driver seat rotational position sensing part 110. The ECU 100 controls one of the first active vent 612 and the second active vent 622 to open and the other to close based on the signal output by the passenger seat rotational position sensing part 120.

FIG. 3 is a schematic diagram illustrating an example of the state of the airbag cushion part in the event of a collision in the case of the first arrangement example of the driver seat 10 and passenger seat 20. The first arrangement example is a case in which the driver seat 10 and the passenger seat 20 are facing forward, which is a normal condition and in which the occupants seated in the driver seat 10 and the passenger seat 20 are facing forward. In the diagram, the active vent is open is illustrated with an arrow that schematically shows the gas being released, while the active vent in the closed state is not marked with an arrow.

The ECU 100 controls one of the first active vent and the second active vent to open and controls the other to close when the first airbag cushion part and the second airbag cushion part expand and deploy, such as during a vehicle collision.

When the active vent in the airbag cushion part is opened, an occupant can be restrained while the pressure in the airbag cushion part is automatically released at the beginning of the expansion and deployment of the airbag cushion part or at the initial stage of the expansion and deployment. This allows the occupant to be restrained while releasing pressure on the airbag cushion part, such as when the occupant is in a position close to the expanding and deploying airbag cushion part (not a normal position).

On the other hand, when the active vent provided in the airbag cushion part is closed, the occupant can be restrained while maintaining the pressure in the airbag cushion part during expansion and deployment of the airbag cushion part. This allows the pressure of the airbag cushion part to be maintained to restrain the occupant, such as when the occupant is in a normal position relative to the expanding and deploying airbag cushion part.

With the above-described configuration, either one of the first airbag cushion part and the second airbag cushion part installed on both sides of the driver seat 10 and the passenger seat 20 of the vehicle 1 can restrain the occupant while automatically releasing the pressure in the airbag cushion part, and the other can restrain the occupant while maintaining the pressure in the airbag cushion part, thereby improving the performance of restraining the occupant.

More specifically, the ECU 100 controls the active vents 512 and 612 provided in the airbag cushion parts 511 and 611 of the first airbag cushion part and the second airbag cushion part closer to the body 2 of the vehicle 1 to open according to the rotational positions of the driver seat 10 and the passenger seat 20, and provides control closing the active vents 522 and 622 provided in the airbag cushion parts 521 and 621 of that that is farther from the body 2.

The airbag cushion parts 511 and 611 closer to the body 2 of the vehicle 1 should restrain the occupant while automatically releasing the pressure in the airbag cushion parts 511 and 611, as the position of the occupant tends to be closer to the airbag cushion parts 511 and 611 during expansion and deployment. The airbag cushion parts 521 and 621 farther from the body 2 tend to see the occupant in a normal position relative to the airbag cushion parts 521 and 621 during expansion and deployment, so it is desirable to maintain the pressure in the airbag cushion parts 521 and 621 to restrain the occupant.

Therefore, by controlling the active vents 512 and 612 provided in the airbag cushion parts 511 and 611 closer to the body 2 of the vehicle 1 to open, and controlling the active vents 522 and 622 provided in the airbag cushion parts 521 and 621 farther from the body 2 to close, the restraining performance of the occupant can be improved.

FIG. 4 is a schematic diagram illustrating an example of the state of the airbag cushion part in the event of a collision in the case of the second arrangement example of the driver seat 10 and passenger seat 20. The second arrangement example is a case in which the driver seat 10 and passenger seat 20 are facing rearward, for example, during autonomous driving and the occupants seated in the driver seat 10 and the passenger seat 20 are facing rearward. In the diagram, the active vent is open is illustrated with an arrow that schematically shows the gas being released, while the active vent in the closed state is not marked with an arrow. In the example of FIG. 4, both the driver seat 10 and the passenger seat 20 face rearward. However, only one of either the driver seat 10 or passenger seat 20 may be facing rearward.

As illustrated in FIG. 4, the ECU 100 controls the active vents 522 and 622 provided in the airbag cushion parts 521 and 621 of the first airbag cushion part and the second airbag cushion part that is closer to the body 2 of the vehicle 1 to open according to the rotational positions of the driver seat 10 and the passenger seat 20, and provides control closing the active vents 512 and 612 provided in the airbag cushion parts 511 and 611 of that that is farther from the body 2.

The airbag cushion parts 521 and 621 closer to the body 2 of the vehicle 1 should restrain the occupant while automatically releasing the pressure in the airbag cushion parts 521 and 621, as the position of the occupant tends to be closer to the airbag cushion parts 521 and 621 during expansion and deployment. The airbag cushion parts 511 and 611 farther from the body 2 tend to see the occupant in a normal position relative to the airbag cushion parts 511 and 611 during expansion and deployment, so it is desirable to maintain pressure in the airbag cushion parts 511 and 611 to restrain the occupant.

Therefore, by controlling the active vents 522 and 622 provided in the airbag cushion parts 521 and 621 closer to the body 2 of the vehicle 1 to open, and controlling the active vents 512 and 612 provided in the airbag cushion parts 511 and 611 farther from the body 2 to close, the restraining performance of the occupant can be improved even if the driver seat 10 or the passenger seat 20 in the vehicle 1 are rotated.

In the example of FIG. 4, the driver seat 10 and the passenger seat 20 are installed to be rotatable, but the movement of the seats is not limited to rotational movement, and may also move linearly. In other words, the ECU 100 can control one of the first active vent and the second active vent to open and the other to close according to the movement positions of the driver seat 10 and the passenger seat 20 that are movable in the vehicle 1. Movable includes, for example, rotational movement, linear movement, and the like. A change in the movement position of the seat can change the position of the occupant relative to the expanding and deploying airbag cushion part from a normal position (or a more normal position) to a non-normal position (or a less normal position) on one side of the seat width direction (vehicle width direction) to the other.

Therefore, by controlling either one of the first active vent and the second active vent to open and the other to close according to the movement position of the seat, the occupant restraining performance can be improved even when the seat is moved in the vehicle.

Next, specific examples of active venting of the airbag cushion part will be explained.

FIG. 5 is a schematic diagram illustrating a first example of an active vent configuration. Illustrated below is the airbag cushion part 511 in an expanded and deployed state. Although the airbag cushion part 511 will be described, the same applies to the other airbag cushion parts 521, 611, and 621. As illustrated in FIG. 5, the airbag cushion part 511 is provided with an inflator 15, a tether retaining part 16, a tether 17, and an active vent 512, and a vent 513 is formed in the airbag cushion part 511. In the example of FIG. 5, the active vent 512 is folded over the outside of the airbag cushion part 511, a first end of the tether 17 is connected to the tether retaining part 16, and a second end of the tether 17 is connected to the active vent 512 through the vent 513. The tether retaining part 16 can comprise, for example, an actuator or the like, and retains or does not retain the tether 17 based on a control signal output by the ECU 100. The tether 17 can be formed of a hard and strong material such as, for example, a nylon woven fabric, and is in the form of a string or band.

When the ECU 100 outputs a control signal to close the active vent, the tether retaining part 16 ceases to retain the first end of the tether 17. The tether 17 is relaxed and the active vent 512 plugs the vent 513. As a result, the airbag cushion part 511 expands and deploys in a closed state.

On the other hand, when the ECU 100 outputs a control signal to open the active vent, the tether retaining part 16 retains one end of the tether 17. The tether 17 is then pulled. As the airbag cushion part 511 expands and deploys, for example, at the beginning or initial stages of expansion and deployment, the tether 17 operates to unfold the folded active vent 512, causing a portion of the active vent 512 to separate from the vent 513 and the vent 513 to open. As a result, the airbag cushion part 511 opens, expanding and deploying.

FIG. 6 is a schematic diagram illustrating a second example of an active vent configuration. In the example of FIG. 6, the active vent 512 is tacked around the vent 513 of the airbag cushion part 511. One end of the tether 17 is connected to the tether retaining part 16 and the other end of the tether 17 is tied to the active vent 512.

When the ECU 100 outputs a control signal to close the active vent, the tether retaining part 16 ceases to retain the first end of the tether 17. The tether 17 is relaxed and the active vent 512 plugs the vent 513. As a result, the airbag cushion part 511 expands and deploys in a closed state.

On the other hand, when the ECU 100 outputs a control signal to open the active vent, the tether retaining part 16 retains one end of the tether 17. The tether 17 is then pulled. As the airbag cushion part 511 expands and deploys, for example, at the initial or early stages of expansion and deployment, the tether 17 operates to unfold the active vent 512, causing a portion of the active vent 512 to separate from the vent 513 and the vent 513 to open. As a result, the airbag cushion part 511 opens, expanding and deploying.

FIG. 7 is a schematic diagram illustrating a third example of an active vent configuration. In the example of FIG. 7, the active vent 512 is a bundle of base material around the vent of the airbag cushion part 511 and tied down by the tether 17. In this state, the vent is in a closed state.

When the ECU 100 outputs a control signal to close the active vent, the tether retaining part 16 retains the first end of the tether 17. The tether 17 is then pulled. The tether 17 keeps the base material around the vent tied off, and the airbag cushion part 511 expands and deploys while remaining closed.

On the other hand, when the ECU 100 outputs a control signal to open the active vent, the tether retaining part 16 ceases to retain the first end of the tether 17. The tether 17 is then relaxed. As the airbag cushion part 511 expands and deploys, the pressure within the airbag cushion part 511 operates to undo the tether 17 that binds the base material around the vent, causing the vent to be released. As a result, the airbag cushion part 511 opens, expanding and deploying.

FIG. 8 is a schematic diagram illustrating a fourth example of an active vent configuration. In the example of FIG. 8, a patch 18 is provided. The patch 18 can be formed, for example, of a base material or other suitable fabric, and the shape of the patch 18 can be rectangular, circular, triangular, or any other shape, as long as the shape allows the vent 513 to open and close. The patch 18 is stitched or glued around the vent 513 so as to plug the vent 513.

When the ECU 100 outputs a control signal to close the active vent, the tether retaining part 16 ceases to retain the first end of the tether 17. The tether 17 is then relaxed. The patch 18 remains sewn or glued around the vent 513 and the airbag cushion part 511 expands and deploys while remaining closed.

On the other hand, when the ECU 100 outputs a control signal to open the active vent, the tether retaining part 16 retains one end of the tether 17. The tether 17 is then pulled. As the airbag cushion part 511 expands and deploys, the patch 18 is pulled by the tether 17, causing some of the portions sewn or glued around the vent 513 to open. As a result, the airbag cushion part 511 opens, expanding and deploying.

As described above, the active vent is provided with a patch 18 that opens or closes a vent 513 in the airbag cushion part 511. The same is true for the active vents in each of the airbag cushion parts 521, 611, and 621. The patch 18 can be formed, for example, of a base material or other suitable fabric, and the shape can be rectangular, circular, triangular, or other suitable shape, as long as the shape is capable of keeping the vent 513 open or closed.

The airbag cushion part 511 has the tether 17 that is connected at the first end to the patch 18 and at the second end to the tether retaining part 16. The same applies to the airbag cushion parts 521, 611, and 621. The tether 17 can be formed of a hard and strong material such as, for example, a nylon woven fabric, and is in the form of a string or band. The tether retaining part 16 can comprise, for example, an actuator or the like, and can retain or cease to retain the second end of the tether 17 based on a control signal output by the ECU 100.

The tether retaining part 16 retains or ceases to retain the tether 17, which allows the patch 18 to open or close the vent 513. For example, in retaining the tether 17, the tether retaining part 16 may retain the tether 17 in a taut state within the expanding and deploying airbag cushion part 511, thereby releasing the patch 18 from the vent 513 and causing the vent 513 to open, as illustrated in FIG. 8, or the patch 18 may be adhered to the vent 513 (not shown) to close the vent 513. Furthermore, the tether retaining part 16 can cease to retain the tether 17, thereby relaxing the tether 17 in the expanding and deploying airbag cushion part 511, as illustrated in FIG. 8, and the patch 18 may be adhered to the vent 513 to close the vent 513, and the patch 18 may be detached from the vent 513 (not shown) to open the vent 513. This enables individually and independently opening or closing each of the airbag cushion parts 511, 521, 611, and 621 according to the control signal output by the ECU 100.

FIG. 9A and FIG. 9B are schematic diagrams illustrating a fifth example of an active vent configuration. FIG. 9A illustrates a schematic diagram of the fourth example of FIG. 8, described above, from a different angle. As illustrated in FIG. 9A, when the airbag cushion part 511 is closed, the tether 17 is relaxed and the patch 18 is sewn or adhered around the vent 513 with the vent 513 plugged. On the other hand, when the airbag cushion part 511 is open, the tether 17 become pulled and the patches 18 are pulled by the tether 17, dislodging some of the portions sewn or glued around the vent 513, leaving the vent 513 open.

FIG. 9B shows a fifth example when viewed from the same direction as FIG. 9A. In FIG. 9B, if the direction in which the tether 17 is pulled is hypothetically the X-axis direction, instead of the configuration (FIG. 9A) in which the position of the vent 513 is at or near the X-axis, the vent 513 is provided at a position displaced in the Y-axis direction from the position of the tether 17. By using the configuration of FIG. 9B, when the airbag cushion part 511 expands and deploys and the tether 17 is pulled, a portion of the patch 18 does not immediately disengage from the vent 513, and the vent 513 remains plugged for a short period, thus allowing a faster speed of the airbag cushion part 511 expanding and deploying in the Y-direction.

FIG. 10 is a schematic diagram illustrating a sixth example of an active vent configuration. In the example of FIG. 10, the airbag cushion part 511 is provided with a baffle 515. The baffle 515 can be formed, for example, of the necessary base material, and a vent 513 can be formed in the plate-shaped base material, which can be folded to plug the vent 513 and deployed to open the vent 513. By tightening the baffle 515 using the tether 17, the baffle 515 can be folded, and by loosening the tether 17, the baffle 515 can be made deployable and the vent 513 can be opened.

When the ECU 100 outputs a control signal to close the active vent, the tether retaining part 16 retains the first end of the tether 17. The tether 17 is then pulled. The baffle 515 will remain tightened by the tether 17 and the vent 513 will remain blocked. The airbag cushion part 511 expands and deploys in a closed state.

On the other hand, when the ECU 100 outputs a control signal to open the active vent, the tether retaining part 16 ceases to retain the first end of the tether 17. The tether 17 is then relaxed. The baffle 515 is deployed, opening the vent 513. As a result, the airbag cushion part 511 opens, expanding and deploying.

FIG. 11 is a schematic diagram illustrating a seventh example of an active vent configuration. In the example of FIG. 11, the airbag cushion part 511 has a belt-shaped patch 181 with a vent 181*a* formed, and a guide 182 with a vent 182*a* slidably holding the patch 181 inserted inside. As the relative positions of the patch 181 and the guide 182 change, the vent is open when the position of the vent 181*a* and the position of the vent 182*a* overlap in whole or in part, and the vent is closed when the position of the vent 181*a* and the position of the vent 182*a* are completely offset (do not overlap at all).

When the ECU 100 outputs a control signal to close the active vent, the tether retaining part 16 ceases to retain the first end of the tether 17. The tether 17 is then relaxed. The relative positions of the patch 181 and the guide 182 are maintained, and the position of the vent 181*a* is completely offset from the position of the vent 182*a*. The airbag cushion part 511 expands and deploys in a closed state.

On the other hand, when the ECU 100 outputs a control signal to open the active vent, the tether retaining part 16 retains one end of the tether 17. The tether 17 is then pulled. As the airbag cushion part 511 expands and deploys, the relative positions of the patch 181 and the guide 182 change, and the position of the vent 181*a* and the position of the vent 182*a* overlap in whole or in part, opening the vent. As a result, the airbag cushion part 511 opens, expanding and deploying.

Next, the head cushion part for occupant head protection is described.

A head cushion part 517 for protecting the head of an occupant is provided in the airbag cushion part 511. Similarly, the airbag cushion parts 521, 611, and 621 are also provided with a head cushion part. For example, when the airbag cushion parts 511 and 521 expand and deploy, one of either the head cushion part provided in the airbag cushion part 511 or the head cushion part provided in the airbag cushion part 521 can be expanded and deployed. Similarly, when the airbag cushion parts 611 and 621 expand and deploy, one of either the head cushion part provided in the airbag cushion part 611 or the head cushion part provided in the airbag cushion part 621 can be expanded and deployed. The other head cushion part is not be expanded and deployed, for example, by remaining stored inside the airbag cushion part.

With the configuration described above, the head cushion part installed in either one of the first airbag cushion part and the second airbag cushion part installed on both sides of the seat can restrain the occupant while automatically releasing internal pressure, and the head cushion part installed in the other can restrain the occupant while maintaining pressure, thereby improving the performance of restraining the occupant.

FIG. 12 is a schematic diagram illustrating a first example of the state of the head cushion part during a collision. In the following, the airbag cushion part 511 will be explained, but the same applies to other airbag cushion parts 521, 611, and 621. As illustrated in FIG. 12, when the airbag cushion part 511 is controlled to close, the head cushion part 517 provided in the airbag cushion part 511 is expanded and deployed. When the airbag cushion part 511 is controlled to open, the head cushion part 517 provided in the airbag cushion part 511 is not deployed. In other words, when either the first airbag cushion part or the second airbag cushion part is controlled to close, the head cushion part provided in the airbag cushion part controlled to close is expanded and deployed. When the airbag cushion part is closed, the position of the occupant is normal (not near) to the airbag cushion part, so the head cushion part is expanded and deployed to protect the head of the occupant. This improves the restraining performance of the occupant.

More specifically, all or part of the head cushion part 517 is stored inside the airbag cushion part 511. For example, all or part of the head cushion part 517 is folded toward the inside of the airbag cushion part 511. The folded portion is also referred to as the tucked-in portion. The same is true for the other airbag cushion parts 521, 611, and 621.

As illustrated in FIG. 12, the gas inside the airbag cushion part 511 controlled to close expands and deploys the head cushion part 517 stored inside the airbag cushion part 511. By controlling the airbag cushion part 511 to close, when the pressure inside the airbag cushion part 511 at the time of expansion and deployment becomes higher than a certain level, the gas inside the airbag cushion part 511 flows into the head cushion part 517, and the head cushion part 517, which is stored inside the airbag cushion part 511, can expand (push out) toward the outside of the airbag cushion part 511, and the head cushion part 517 can be expanded and deployed. In this case, the tether retaining part 16 retains the tether 17, and the active vent 512 closes the vent 513.

The tether retaining part 16 ceases to retain the tether 17, and the active vent 512 opens the vent 513. By controlling the airbag cushion part 511 to open, the pressure inside the airbag cushion part 511 does not increase during expansion and deployment, and the head cushion part 517 remains stored inside the airbag cushion part 511.

FIG. 13 is a schematic diagram illustrating a second example of the state of the head cushion part during a collision. In the second example, as in the first example, all or part of the head cushion part 517 is stored inside the airbag cushion part 511. For example, all or part of the head cushion part 517 is folded toward the inside of the airbag cushion part 511. In the second example, the first end of the tether 17 is connected to the tether retaining part 16, and the second end of the tether 17 is connected to the required position of the head cushion part 517.

In the closed state illustrated in FIG. 13, the head cushion part 517 is expanded and deployed. For example, the head cushion part 517 can be expanded and deployed by gas supplied by the inflator 15. Specifically, the head cushion part 517 can be expanded and deployed by the tether retaining part 16 ceasing to retain the tether 17. In this case, the pressure inside the airbag cushion part 511 does not increases past a prescribed value because the head cushion part 517 expands and deploys, and the active vent 512 keeps the vent 513 closed enabling keeping the airbag cushion part 511 in a closed state.

In the open state illustrated in FIG. 13, the head cushion part 517 remains stored inside the airbag cushion part 511. Specifically, the tether retaining part 16 retains the tether 17, thereby allowing the head cushion part 517 to remain stored within the airbag cushion part 511. In this case, the pressure inside the airbag cushion part 511 increases past a prescribed value because the head cushion part 517 is not deployed, and said pressure causes the active vent 512 to open the vent 513 so that the airbag cushion part 511 can be opened.

In the above-described embodiment, the airbag cushion part 511 and the airbag cushion part 521 can be the same bag shape (same shape) in a non expanded-deployed state. The non expanded-deployed state can be a state in which the airbag cushion parts 511 and 521 are assembled (fabricated), for example, unfolded on a flat surface. Similarly, the airbag cushion part 611 and the airbag cushion part 621 can be the same bag shape in a non expanded-deployed state.

As a result, the occupant can be restrained while automatically releasing the pressure in the same manner in both the first airbag cushion part and the second airbag cushion part installed on both sides of the seat, and the occupant can be restrained while maintaining the pressure in the same manner in both the first airbag cushion part and the second airbag cushion part in the same manner.

In the embodiments described above, each of the airbag cushion parts 511, 521, 611, and 621 can have an active vent opposite an opening portion that supplies gas into the airbag cushion part in an expanded and deployed state. Here, the opening portion may be, for example, a gas feed port of the inflator 15 and 25, or, in the case where the airbag is provided with a bulkhead covering the inflator 15 and 25 inside the airbag cushion parts 511, 521, 611, 621, the opening may be a gas feed port provided in the bulkhead.

This suppresses the gas supplied from the opening portion from being immediately released from the active vent when the airbag cushion part is expanded and deployed by supplying gas from the opening portion into the airbag cushion part at the time of a collision or the like, so that the airbag cushion part can be expanded and deployed in a required state (for example, in the required shape or the required internal pressure).

Next, the arrangement of the seats in the vehicle 1 will be described.

FIG. 14 is a schematic diagram illustrating an example of the state of the airbag cushion part in the event of a collision in the case of the third arrangement example of the driver seat 10 and passenger seat 20. The third arrangement is a case where the driver seat 10 and the passenger seat 20 are facing each other, for example, during autonomous driving, and the occupants seated in the driver seat 10 and the passenger seat 20 are facing each other. The relative positions of the driver seat 10 and the passenger seat 20 in the vehicle length direction can be shifted appropriately. In the diagram, the open active vent is illustrated with an arrow that schematically shows the gas being released, while the active vent in the closed state is not marked with an arrow.

The airbag cushion parts 511 and 611 closer to the body 2 or instrument panel of the vehicle 1 should restrain the occupant while automatically releasing the pressure in the airbag cushion parts 511 and 611, because the position of the occupant tends to be closer to the airbag cushion parts 511 and 611 during expansion and deployment. The airbag cushion parts 521 and 621 on the far side or interior side of the vehicle from the body 2 should maintain the pressure in the airbag cushion parts 521 and 621 to restrain the occupant, since the occupant tends to be in a normal position relative to the airbag cushion parts 521 and 621 during expansion and deployment.

Therefore, by controlling the active vents 512 and 612 provided in the airbag cushion parts 511 and 611 closer to the body 2 or the instrument panel of the vehicle 1 to open, and controlling the active vents 522 and 622 provided in the airbag cushion parts 521 and 621 farther from the body 2 or on the interior side of the vehicle to close, the restraining performance of the occupant can be improved even if the driver seat 10 or the passenger seat 20 in the vehicle 1 are rotated.

FIG. 15 is a schematic diagram illustrating an example of the state of the airbag cushion part in the event of a collision in the case of the fourth arrangement example of the driver seat 10 and passenger seat 20. The fourth arrangement is when the driver seat 10 and the passenger seat 20 are facing backward and facing each other, for example, during autonomous driving, and the occupants seated in the driver seat 10 and the passenger seat 20 are facing backward and each other. In the case of the fourth arrangement example, the same control can be performed as in the case of the second arrangement example, so the explanation is omitted.

FIG. 16 is a schematic diagram illustrating an example of the state of the airbag cushion part in the event of a collision in the case of the fifth arrangement example of the driver seat 10 and passenger seat 20. The fifth arrangement shows an example of a case where, in addition to the driver seat 10 and the passenger seat 20, the rear seat 30 can also be separated and moved, for example, during autonomous driving. Since the arrangement example of the driver seat 10 and the passenger seat 20 is the same as the third arrangement example in FIG. 14, the same control as in the third arrangement example can be performed.

As illustrated in FIG. 16, the rear seat 30 can be separated into a first rear seat 30a and a second rear seat 30b, wherein the first rear seat 30a and the second rear seat 30b are facing each other, and the occupants seated in the first rear seat 30a and the second rear seat 30b are also facing each other. In this case, as in the case of the driver seat 10 and the passenger seat 20, the rear seats can be provided with a rear seat rotational position sensing part capable of detecting separation or movement of the rear seats 30.

The airbag cushion parts 321a, 321b closer to the body 2 on the rear side of the vehicle 1 should restrain the occupant while automatically releasing the pressure in the airbag cushion parts 321a, 321b because the occupant's position tends to be closer to the airbag cushion parts 321a, 321b during expansion and deployment. This is desirable. The airbag cushion parts 311a and 311b on the far side or interior side of the vehicle from the body 2 of the rear should maintain the pressure in the airbag cushion parts 311a and 311b to restrain the occupant, since the occupant tends to be in a normal position relative to the airbag cushion parts 311a and 311b during expansion and deployment.

Therefore, by controlling the active vents 322a and 322b provided in the airbag cushion parts 321a and 321b closer to the rear side of the body 2 of the vehicle 1 to open, and controlling the active vents 312a and 312b provided in the airbag cushion parts 311a and 311b farther or on the vehicle interior side of the rear side of the body 2, the restraining performance of the occupant can be improved even if the rear seats 30 are moved inside the vehicle 1.

The airbag device of the present embodiment includes a first airbag cushion part and a second airbag cushion part installed on each side of a seat of a vehicle, a first active vent provided in the first airbag cushion part and a second active vent provided in the second airbag cushion part, and a controller that controls the first active vent or the second active vent to open and the other to close when the first airbag cushion part and the second airbag cushion part are expanded and deployed.

A first airbag cushion part and a second airbag cushion part are installed on both sides of a seat of a vehicle, wherein a first active vent is provided in the first airbag cushion part and a second active vent is provided in the second airbag cushion part. The controller controls one of the first active vent and the second active vent to open and controls the other to close when the first airbag cushion part and the second airbag cushion part expand and deploy, such as during a vehicle collision.

The airbag cushion part provided with active vents is expanded and deployed by gas supplied by an inflator (gas generating device) in the event of a vehicle collision. When the active vent in the airbag cushion part is opened, an occupant can be restrained while the pressure in the airbag cushion part is automatically released at the beginning of the expansion and deployment of the airbag cushion part or at the initial stage of the expansion and deployment. This allows the occupant to be restrained while releasing pressure on the airbag cushion part, such as when the occupant is in a position close to the expanding and deploying airbag cushion part (not a normal position).

On the other hand, when the active vent provided in the airbag cushion part is closed, the occupant can be restrained while maintaining the pressure in the airbag cushion part during expansion and deployment of the airbag cushion part. This allows the pressure of the airbag cushion part to be maintained to restrain the occupant, such as when the occupant is in a normal position relative to the expanding and deploying airbag cushion part.

With the configuration described above, either one of the first airbag cushion part and the second airbag cushion part installed on both sides of the seat of the vehicle can restrain the occupant while automatically releasing the pressure in the airbag cushion part, and the other can restrain the occupant while maintaining the pressure in the airbag cushion part, thereby improving restraining performance of the occupant.

Regarding the airbag device according to the present embodiment, the controller can control one of the first active vent and the second active vent to be open and the other to be closed according to the movement positions of the seats that are movable in the vehicle.

The controller can control one of the first active vent and the second active vent to open and the other to close according to the movement positions of the seat that are movable in the vehicle. Movable includes, for example, rotational movement, linear movement, and the like. A change in the movement position of the seat can change the position of the occupant relative to the expanding and deploying airbag cushion part from a normal position (or a more normal position) to a non-normal position (or a less normal position) on one side of the seat width direction (vehicle width direction) to the other.

Therefore, by controlling one of the first active vent and the second active vent to open and the other to close according to the movement position of the seat, the restraining performance of the occupant can be improved even when the seat is moved in the vehicle.

Regarding the airbag device according the present embodiment, the controller controls the active vent provided in the airbag cushion part among the first airbag cushion part and the second airbag cushion part closer to the body of the vehicle to open according to the rotational position of the seat, and controls the active vent provided in the airbag cushion part farther from the body to close.

The controller controls the active vent provided in the airbag cushion part among the first airbag cushion part and the second airbag cushion part closer to the body of the vehicle to open according to the rotational position of the seat, and controls the active vent provided in the airbag cushion part farther from the body to close.

The rotational position of the seat includes, for example, a normal position in which the occupant is facing forward of the vehicle and a reversed position in which the occupant is facing rearward of the vehicle. Regardless of the rotational position of the seat, the airbag cushion part closer to the body of the vehicle should restrain the occupant while automatically releasing the pressure in the airbag cushion part, since the occupant tends to be positioned closer to the airbag cushion part during expansion and deployment. The airbag cushion part farther from the body should maintain the pressure in the airbag cushion part to restrain the occupant, as the occupant tends to be in a normal position relative to the airbag cushion part during expansion and deployment.

Therefore, by controlling the active vent provided in the airbag cushion part closer to the body of the vehicle to open and controlling the active vent provided in the airbag cushion part farther from the body to close, the restraining performance of the occupant can be improved even when the seat is rotated in the vehicle.

Regarding the airbag device according to the present embodiment, a first head cushion part for protecting the head of an occupant is provided in the first airbag cushion part and a second head cushion part for protecting the head of an occupant is provided in the second airbag cushion part, such that either one of the first head cushion part or the second head cushion part is expanded and deployed when the first airbag cushion part or the second airbag cushion part is expanded and deployed.

The first head cushion part for protecting the head of an occupant is provided in the first airbag cushion part, and the second head cushion part is provided in the second airbag cushion part. When the first airbag cushion part and the second airbag cushion part expand and deploy, either the first head cushion part or the second head cushion part is expanded and deployed. The other head cushion part is not be expanded and deployed, for example, by remaining stored inside the airbag cushion part.

With the configuration described above, the head cushion part installed in either one of the first airbag cushion part and the second airbag cushion part installed on both sides of the vehicle seat can restrain the occupant while automatically releasing the internal pressure, and the head cushion part installed in the other can restrain the occupant while maintaining the pressure, thereby improving occupant restraining performance.

Regarding the airbag device according to the present embodiment, when either one of the first airbag cushion part or the second airbag cushion part is controlled to close, the head cushion part of the airbag cushion part controlled to close is expanded and deployed.

When either the first airbag cushion part or the second airbag cushion part is controlled to close, the head cushion part provided in the airbag cushion part controlled to close is expanded and deployed. When the airbag cushion part is closed, the position of the occupant is normal (not near) to the airbag cushion part, so the head cushion part is expanded and deployed to protect the head of the occupant. This improves the restraining performance of the occupant.

Regarding the airbag device according to the present embodiment, all or a part of the first head cushion part is stored inside the first airbag cushion part and all or a part of the second head cushion part is stored inside the second airbag cushion part, such that the head cushion part stored inside the airbag cushion part is expanded and deployed by the gas inside the airbag cushion part controlled to be closed.

All or part of the first head cushion part is stored inside the first airbag cushion part. For example, all or part of the first head cushion part is folded toward the inside of the first airbag cushion part. The folded portion is also referred to as the tucked-in portion. All or part of the second head cushion part is stored inside the second airbag cushion part. For example, all or part of the second head cushion part is folded toward the inside of the second airbag cushion part.

The gas inside the airbag cushion part controlled to close expands and deploys the head cushion part stored inside the airbag cushion part. By controlling the airbag cushion part to close, when the pressure inside the airbag cushion part at the time of expansion and deployment becomes higher than a certain level, the gas inside the airbag cushion part flows into the head cushion part, and the head cushion part, which is stored inside the airbag cushion part, can expand (push out) toward the outside of the airbag cushion part, and the head cushion part can be expanded and deployed.

Regarding the airbag device according to the present embodiment, all or part of the first head cushion part is stored inside the first airbag cushion part, and all or part of the second head cushion part is stored inside the second airbag cushion part, such that by expanding and deploying either one of the first head cushion part or the second head cushion part, the expanding and deploying head cushion part closes off the airbag cushion part it was stored in.

All or part of the first head cushion part is stored inside the first airbag cushion part. For example, all or part of the first head cushion part is folded toward the inside of the first airbag cushion part. The folded portion is also referred to as the tucked-in portion. All or part of the second head cushion part is stored inside the second airbag cushion part. For example, all or part of the second head cushion part is folded toward the inside of the second airbag cushion part.

Either the first head cushion part or the second head cushion part is expanded and deployed. For example, either the first head cushion part or the second head cushion part can be expanded and deployed by gas supplied by an inflator (gas generating device). As the head cushion part expands and deploys, the pressure inside the airbag cushion part storing the head cushion part does not increase, and the active vent can remain in a closed state, allowing the airbag cushion part to remain in a closed state.

In the airbag device of the present embodiment, the first airbag cushion part and the second airbag cushion part have the same bag shape in a non expanded-deployed state.

The first airbag cushion part and the second airbag cushion part have the same bag shape in the non expanded-deployed state. As a result, the occupant can be restrained while automatically releasing the pressure in the same manner in either the first airbag cushion part or the second airbag cushion part installed on both sides of the vehicle seat, and the occupant can be restrained while maintaining the pressure in the same manner in either the first airbag cushion part or the second airbag cushion part.

Regarding the airbag device according to the present embodiment, the first airbag cushion part and the second airbag cushion part are respectively arranged with the first active vent and the second active vent arranged so as to face the opening portion for supplying gas inside the first airbag cushion part and the second airbag cushion part in the expanded and deployed state.

The first airbag cushion part and the second airbag cushion part are respectively arranged with the first active vent and the second active vent facing the opening portion for supplying gas inside the first airbag cushion part and the second airbag cushion part in the expanded and deployed.

This prevents the gas supplied from the opening portion from being immediately released from the active vent when the airbag cushion part is expanded and deployed by supplying gas from the opening portion into the airbag cushion part at the time of a collision or the like, so that the airbag cushion part can be expanded and deployed in a required state.

Regarding the airbag device according to the present embodiment, wherein the first active vent and the second active vent are respectively provided with a patch that can open or close a vent provided on the first airbag cushion part and the second airbag cushion part, the first airbag cushion part and the second airbag cushion part each have a tether connected at one end to the patch and connected at the other end to a tether retaining part provided, which either retains or ceases to retain the tether, where the patch either opens or closes the vent by the tether retaining part either retaining or ceasing to retain the tether.

The first active vent is provided with a patch that opens or closes a vent in the first airbag cushion part, and the second active vent is provided with a patch that opens or closes a vent in the second airbag cushion part. The patch can be formed, for example, of a base material or other suitable fabric, and the shape can be rectangular, circular, triangular, or any other shape, as long as the shape allows the vent to open and close.

Each of the first airbag cushion part and the second airbag cushion part is provided with a tether that is connected at a first end to the patch and at a second end to a tether retaining part. The tether can be formed of a hard, strong material, such as a nylon weave, for example, and is in the form of a string or band. The tether retaining part can be made up of, for example, an actuator or the like, and can retain or cease to retain the second end of the tether based on an external control signal.

The tether retaining part retains or ceases to retain the tether, which causes the patch to open or close the vent. For example, the tether retaining part may retain the tether within the expanding and deploying airbag cushion part, thereby keeping the patch in close contact with the vent and keeping the vent closed, or the patch may be detached from the vent to keep the vent open. The tether retaining part may cease to retain the tether, relaxing the tether within the expanding and deploying airbag cushion part, thereby keeping the patch in close contact with the vent and keeping the vent closed, or the patch may be detached from the vent to open the vent. This allows the first airbag cushion part and the second airbag cushion part to be in both an open state and in a closed state.

REFERENCE NUMERALS

1: Vehicle
2: Body
3: Steering wheel
10: Driver seat
20: Passenger seat
30: Rear seat
30a: First rear seat
30b: Second rear seat
11, 21, 31: Seatback
12, 22, 32: Headrest
51, 52, 61, 62: Storing part
15, 25: Inflator
16: Tether retaining part
17: Tether
18: Patch
100: ECU
110: Driver seat rotational position sensing part
120: Passenger seat rotational position sensing part
130: Sensor
511, 521, 611, 621, 311a, 311b, 321a, 321b: Airbag cushion part
512, 522, 612, 622, 312a, 312b, 322a, 322b: Active vent
513: 181a, 182a: Vent
515: Baffle
181: Patch
182: Guide
517: Head cushion part
516: Sewed part
516a: Break

The invention claimed is:

1. An airbag device in combination with a seat mounted within a vehicle, the airbag device comprising:
a first airbag cushion part and a second airbag cushion part installed on first and second lateral sides of the seat, respectively;
a first active vent provided in the first airbag cushion part and a second active vent provided in the second airbag cushion part; and
a controller for controlling one of the first and second active vents to open and an other of the first and second active vents to close when the first airbag cushion part and the second airbag cushion part are expanded and deployed,
wherein the controller operates to close the first active vent and open the second active vent when the seat is in a first rotational position with the first airbag cushion part is closer to a body of the vehicle than the second airbag cushion part, and the controller further operates to close the second active vent and open the second active vent when the seat is in a second rotational position with the second airbag cushion part closer to the body of the vehicle than the first airbag cushion part.

2. The airbag device according to claim 1, wherein the first airbag cushion part includes a first head cushion part and the second airbag cushion part includes a second head cushion part, and wherein when the first active vent is controlled to close, the first head cushion part of the first airbag cushion part is expanded and deployed, and when the second active vent is controlled to close, the second head cushion part of the second airbag cushion part is expanded and deployed.

3. The airbag device according to claim 2, wherein at least a portion of the first head cushion part is stored inside the first airbag cushion part, and at least a portion of the second head cushion part is stored inside the second airbag cushion part, such that the first and second head cushion parts are expanded and deployed by gas inside the corresponding first and second airbag cushion part when the corresponding first and second active vent is controlled to close.

4. The airbag device according to claim 2, wherein at least a portion of the first head cushion part is stored inside the first airbag cushion part, and at least a portion of the second head cushion part is stored inside the second airbag cushion part.

5. The airbag device according to claim 1, wherein the first airbag cushion part and the second airbag cushion part have a common bag-like shape when in a non-expanded or deployed state.

6. The airbag device according to claim 1, wherein the first airbag cushion part and the second airbag cushion part are respectively arranged with the first active vent and the second active vent facing an opening portion for supplying gas into the first airbag cushion part and the second airbag cushion part in an expanded and a deployed state.

7. The airbag device according to claim 1, wherein the first active vent and the second active vent are respectively provided with a patch that can open or close a vent provided on the first airbag cushion part and the second airbag cushion part, the first airbag cushion part and the second airbag cushion part are each provided with a tether with a first end connected to the patch and a second end connected to a tether retaining part, which either retains or ceases to retain the tether, and the patch either opens or closes the vent by the tether retaining part either retaining or ceasing to retain the tether.

8. The airbag device according to claim 1, wherein a first head cushion part for protecting a head of an occupant is provided in the first airbag cushion part and a second head cushion part for protecting the head of an occupant is provided in the second airbag cushion part, the first and second head cushion parts expandable and deployable when a corresponding one of the first and second airbag cushion parts are expanded and deployed.

9. The airbag device according to claim 1, wherein the seat is forward facing in the first rotational position and the seat is rearward facing in the second rotational position.

10. The airbag device according to claim 7, wherein the first and second active vents are folded over an outside of the first and second airbag cushion parts, respectively.

11. The airbag device according to claim 7, wherein the first airbag cushion part incudes a first vent, the second airbag cushion part includes a second vent, and the first and second active vents are tacked around the first and second vents, respectively, such that when the first end of an associated tether of the tethers is released, an associated one of the first and second active vents closes an associated one of the first and second vents.

12. The airbag device according to claim 7, wherein the first airbag cushion part incudes a first vent, the second airbag cushion part includes a second vent, and the first and second active vents are bundles of a material around the first and second vents, respectively.

13. The airbag device according to claim 7, wherein the first airbag cushion part incudes a first vent, the second airbag cushion part includes a second vent, and the first and second active vents each include a patch secured to a respective one of the first and second airbag cushion parts about the first and second vents, respectively, the tethers operative to pull a portion of the patches away from the first and second airbag cushion parts for selectively opening the first and second vents.

14. The airbag device according to claim 13, wherein the tethers are tensioned along an axis and the patches are displaced from the respective first and second airbag cushion parts in a direction skew to the axis.

15. The airbag device according to claim 7, wherein the first airbag cushion part incudes a first vent, the second airbag cushion part includes a second vent, and both of the first and second active vents includes a baffle tightened by one of the tethers to close the associated one of the first and second vents and loosen by the one of the tethers to open the associated one of the first and second vents.

* * * * *